Patented Sept. 5, 1944

2,357,383

UNITED STATES PATENT OFFICE 2,357,383

HALOGENATED RUBBER COMPOSITION

John M. Coe, Verona, N. J., assignor to Carbide and Carbon Chemicals Corporation, New York, N. Y., a corporation of New York No Drawing. Application August 3, 1940, Serial No. 351,227

13 Claims. (Cl. 260—735)

This invention relates to halogen compounds of rubber and similar halogen materials and to a modifier for same, together with products using such modified halogen bearing materials.

The manifold uses in the arts of caoutchouc, gutta percha and similar materials, generally referred to as "rubber" are well known. For many purposes, however, the halogen compounds of rubbers have found favor but their use is somewhat limited by the fact that their properties change when a halogen is added; they lose their flexibility and resiliency and reach a state where they are brittle and crack readily. Furthermore, whereas rubber has a relatively long life and only slowly deteriorates with the production of relatively harmless by-products, the rubbers containing halogen decompose rather rapidly, giving off the halogen which attacks any base material, for instance a textile or metal, to which the halogenated rubber is applied.

I have endeavored to find a modifier for the halogenated rubber (embracing by this term halogen compounds, including the hydrochlorides, of caoutchouc, gutta percha and balata) which will overcome the undesirable characteristics of these materials, and have discovered that glycerol borate, including thereby similar materials for instance glycol borate, or glycerol bori borate or glycol bori borate, are modifiers which answer the requirements. In conjunction with halogenated rubber, these modifiers prevent the noticeable splitting off of the halogen, they act as plasticizers for the halogenated rubber, they are substantially free from materials generating corrosive chlorine, and they preserve the bases to which the halogenated rubber may be applied. These modifiers also act as fire retardants to prevent the smoldering of such combustible materials as may be used as bases for the halogenated rubber.

The tendency of the halogenated rubber to break down with the generation of halogen or the halogen acid is particularly noticeable under certain conditions of use; for instance thin films of the material exposed to sunlight decompose quite rapidly and the halogen, for instance in a textile covered wire, attacks both the textile and the metal of the wire itself. Also a flexible non-cracking halogenated rubber wire coating has heretofore been difficult to obtain. But if the halogenated rubber is modified with glycerol borate, the halogenated rubber loses its brittleness and tendency to crack, its tendency to give off halogen is unexpectedly reduced, seemingly out of all proportion to the amount of glycerol borate added, the metal of the wire is substantially unattacked as is also the textile, and the textile, if combustible, is prevented from smoldering.

The glycerol borate appears not to dissolve in the chlorinated rubber but as it is desired to disseminate the modifier through the chlorinated rubber as thoroughly as possible, a pasty mass may be made by treating chlorinated rubber with a suitable solvent, for instance an evaporable solvent such as toluol or a non-evaporable solvent, such as tricresyl phosphate or dibutyl phthalate, and the glycerol borate, which is a syrupy liquid, may be kneaded into the mass. It is also possible to dissolve the chlorinated rubber in sufficient solvent, for instance toluol, to form a solution and to mix therewith the desired quantity of glycerol borate dissolved in a suitable solvent, for instance methoxyethanol or ethoxyethanol. The solvents for the chlorinated rubber and for the glycerol borate are preferably miscible. The chlorinated rubber and the glycerol borate may also be mixed in any other suitable manner for instance by emulsifying one of the ingredients, or a solution thereof, in a solution of the other, or by mixing emulsions.

To prevent or to reduce materially the breakdown of the halogenated rubber and to prevent the halogen from attacking the other materials present, I prefer to use a minimum of about 1% of glycerol borate, based on the weight of the chlorinated rubber, although I may use up to 5% of the glycerol borate; and I have discovered that only approximately 5% of glycerol borate is needed to prevent or materially to reduce the generation of halogen from the halogenated rubber over prolonged periods of time and thus prevent other materials from being attacked. Of course, higher percentages of glycerol borate may be used but the added reduction in decomposition given by the increased quantity of glycerol borate is small in proportion to the amount of glycerol borate added.

For practical purposes, however, I use more than 5% of the glycerol borate and may use up to 40% or more of glycerol borate, the larger quantity of the modifier being used for plasticity and to quench the afterglow in case the halogenated rubber is used with a combustible material which is subjected to a flame. The advantages of using glycerol borate in conjunction with halogenated rubber are peculiar to this material as the problem of preserving a base does not arise in connection with a base treated with pure rubber. Also in order to make fire-resistant a base which has been treated with pure rubber, so much fire-resisting material has to be used that the quality of the product is affected. The halogenated rubber is itself non-combustible and fireproof in the sense that it will not support combustion (provided it contains sufficient halogen) and if ignited over a Bunsen burner, the flame will go out shortly after removal from the burner; however, if a piece of cotton duck is coated with the fire-resistant halogenated rubber and then ignited over a burner, the mass will smolder for a prolonged period after removal from the burner and after the rubber flame is extinct. But if from 5% to 10% of glycerol borate be mixed with the halogenated rubber and the test repeated, the smoldering ceases almost simultaneously with the cessation of the flame.

The halogenated rubber now on the market and most available for practical use is chlorinated caoutchouc containing about 60% chlorine, as this halogen is the most available and is the least costly of the halogen group. The invention is not limited, however, to the use of chlorinated caoutchouc nor to materials containing 60% halogen.

In combination with the chlorinated caoutchouc and glycerol borate it is possible to include other modifiers, for instance the organic phosphates and the halogenated hydrocarbons, but these do not, so far as I have found, combine all of the advantages obtained by using glycerol borate.

For the purpose of further explaining the invention, reference is made to the following examples which, however, should be considered as merely illustrating the invention and not limiting it to the specific ingredients and proportions given.

*Example 1.*—Twenty-five parts of chlorinated caoutchouc containing 60% chlorine, are thoroughly mixed with 38 parts toluol, 12½ parts tricresyl phosphate, 15½ parts triphenyl phosphate and 7 parts chlorinated diphenyl containing 65% chlorine, to give a fluid mass, and into this mass is worked 2 parts of glycerol borate. If this mass then be coated on cotton duck and the toluol be permitted to evaporate and then the coated duck be submitted to sunlight for a prolonged period of time or to ultra-violet light and moisture for 150 hours, the material is still flexible, there is no noticeable production of chlorine, the cotton is apparently still in its original condition and does not crumble, and after the mass is ignited the rubber flame dies out almost immediately after the ignition flame is removed and there is substantially no afterglow or smoldering of either the caoutchouc or the cotton. The ultra-violet light and moisture test is made by alternately exposing the test material to the light and then to a water spray, usually for equal periods of time of about 12 hours each. The 150 hour test is considered to be the equivalent of two years outdoor exposure.

*Example 2.*—Twenty-five parts of the chlorinated caoutchouc of Example 1, are mixed with 38 parts of toluol, and 28 parts of tricresyl phosphate as in Example 1. To this is added 9 parts glycerol borate. This mass is characterized by better flexibility than the material of Example 1 and quicker quenching of the afterglow. This material is particularly adapted for a preliminary coating or for impregnation of the textile base.

*Example 3.*—Forty-one parts of the chlorinated caoutchouc of Example 1, are mixed with 30 parts of toluol, and 5 parts of tricresyl phosphate. Twelve parts of methoxyethanol and 12 parts of glycerol borate are also mixed separately from the first mixture. The two mixtures are then combined and thoroughly incorporated. This material is characterized by a drier surface than the material of Example 2 and is adapted to be used either alone or as a top coat over the material of Example 2. This material is very efficient in quenching an afterglow and when used by itself is particularly adapted to be applied to a relatively heavy textile.

Instead of the glycerol borate, borates and boriborates of other polyhydric alcohols may be used, for instance sorbitol borate, pentaerythritol borate, mannitol borate and borates of high boiling alcohols, for instance benzyl borate, lauryl borate and amyl borate. The borates should have boiling points above at least 100° C. The alcohols are characterized as being composed of carbon, hydrogen and oxygen in which none of the oxygen atoms are attached to the same carbon atom by more than a single bond.

With any of the previously described compositions, any suitable proportion of pigment may be used in order to obtain the desired colors. The products produced according to the above examples are of such a consistency that they are useful for knife coating and calendering purposes. Very exceptional awning, curtain and covering materials have been made by knife coating these compositions onto cotton duck, the composition of Example 2 being somewhat more flexible than that of Example 3 and being used on lighter cloth, for instance 8 ounce duck, while the composition of Example 3 is used on heavier cloth, for instance 12 ounce duck. The awnings remain flexible and waterproof and the duck does not deteriorate. Also the awnings are non-inflammable to the extent that they will not support combustion and a glowing cigarette or match, dropped on the awning will not ignite the latter. Textiles impregnated with these materials are also adapted to be used as fire resistant curtains, not only for home use but as curtains for welder's frames and in locomotive cabs.

If, instead of surface coating, it be desired to impregnate a base or filling material, for instance paper, textile and the like, sufficient additional toluol or other solvent may be used in any of the above compositions to provide a solution of such viscosity that the textile or other base will be interiorly coated or thoroughly impregnated instead of being merely surface coated. After such interior coating or impregnation, the previously mentioned surface coating may also be applied.

For wire covering, the halogenated rubber and glycerol borate may be mixed, with such other modifiers as are desired, for instance those previously described, and used to cover a bare wire by being extruded around the wire or by application in any other suitable manner. Instead of a bare wire, an enameled or textile covered wire may be used. Also the halogenated rubber and glycerol borate may have mixed with them such pigments, fibers, dyes, and other materials as it has heretofore been impossible to use with chlorinated rubber because they are attacked by chlorine.

From the above description, it will be seen that the glycerol borate has particular advantages when used in conjunction with halogenated rubber but it is also evident that many compositions including these materials may be made and that the compositions may be applied to many and diverse uses. It is therefore desired that the invention be construed as broadly as the appended claims taken in conjunction with the prior art may allow.

I claim:

1. Composition of matter comprising chlorinated rubber and glycerol borate as a modifier for said rubber, the said borate being present in an amount from the small quantity necessary to stabilize said rubber up to a quantity sufficient to render the composition plastic, said amount being not less than about 1% by weight of said rubber; the composition, exclusive of said rubber, being substantially free from materials generating corrosive chlorine.

2. Composition of matter comprising chlorinated rubber and a modifier therefor comprising glycerol borate, the modifier being substantially free from materials generating corrosive chlorine and containing said borate in an amount to provide in the composition a minimum of about 1% of said borate based on the weight of said rubber.

3. Composition of matter comprising chlorinated rubber and a borate of a polyhydric alcohol as a modifier for said rubber, the said borate being present in an amount from the small quantity necessary to stabilize said rubber up to a quantity sufficient to render the composition plastic, said amount being not less than about 1% by weight of said rubber; the composition, exclusive of said rubber, being substantially free from materials generating corrosive chlorine.

4. Composition of matter comprising halogenated rubber and a borate of an alcohol as a modifier for said rubber, said borate being present in an amount from the small quantity necessary to stabilize said rubber up to a quantity sufficient to render the composition plastic, said amount being not less than about 1% by weight of said rubber; the said alcohol having a boiling point above 137° C. and being composed of carbon, hydrogen and oxygen in which none of the oxygen atoms are attached to the same carbon atom by more than a single bond; the composition, exclusive of said rubber, being substantially free from materials generating corrosive chlorine.

5. Composition of matter comprising halogenated rubber and a borate of a polyhydric alcohol as a modifier for said rubber, the said borate having a boiling point of at least 100° C. and being present in an amount from the small quantity necessary to stabilize said rubber up to a quantity sufficient to render the composition plastic, said amount being not less than about 1% by weight of said rubber; the composition, exclusive of said rubber, being substantially free from materials generating corrosive chlorine.

6. Composition of matter comprising halogenated rubber and a borate of an alcohol as a modifier for said rubber, the said borate having a boiling point of at least 100° C. and being present in an amount from the small quantity necessary to stabilize said rubber up to a quantity sufficient to render the composition plastic, said amount being not less than about 1% by weight of said rubber; the said alcohol being composed of carbon, hydrogen and oxygen in which none of the oxygen atoms are attached to the same carbon atom by more than a single bond; the composition, exclusive of said rubber, being substantially free from materials generating corrosive chlorine.

7. Composition of matter comprising halogenated rubber and a modifier therefor comprising a borate of a polyhydric alcohol, said borate being present in an amount greater than 1% by weight of the chlorinated rubber and having a boiling point of at least 100° C., said modifier being substantially free from materials generating corrosive chlorine.

8. Composition of matter comprising a combustible material, chlorinated rubber and a borate of an alcohol, the said borate having a boiling point of at least 100° C. and being present in an amount from the small quantity necessary to stabilize said rubber up to a quantity sufficient materially to reduce the combustibility of said combustible material, said amount being not less than about 1% by weight of said rubber; the said alcohol being composed of carbon, hydrogen and oxygen in which none of the oxygen atoms are attached to the same carbon atom by more than a single bond; the composition, exclusive of said rubber, being substantially free from materials generating corrosive chlorine.

9. As an article of manufacture, a metallic base and in juxtaposition thereto a composition containing chlorinated rubber and a borate of a polyhydric alcohol as a modifier for said rubber, the said borate being present in an amount from the small quantity necessary to stabilize said rubber up to a quantity sufficient to render the composition plastic, said amount being not less than about 1% by weight of said rubber; the composition, exclusive of said rubber, being substantially free from materials generating corrosive chlorine.

10. As an article of manufacture, a textile and in juxtaposition thereto a composition containing chlorinated rubber and a borate of a polyhydric alcohol as a modifier for said rubber, the said borate being present in an amount from the small quantity necessary to stabilize said rubber up to a quantity sufficient to render the composition plastic, said amount being not less than about 1% by weight of said rubber; the composition, exclusive of said rubber, being substantially free from materials generating corrosive chlorine.

11. As an article of manufacture, a base having a covering of a composition comprising chlorinated rubber and a polyhydric alcohol borate as a modifier for said rubber, the said borate having a boiling point of at least 100° C. and being present in an amount from the small quantity necessary to stabilize said rubber up to a quantity sufficient to render the composition plastic, said amount being not less than about 1% by weight of said rubber; the composition, exclusive of said rubber, being substantially free from materials generating corrosive chlorine.

12. As an article of manufacture, a porous base impregnated with an impregnating composition comprising chlorinated rubber and a polyhydric alcohol borate as a modifier for said rubber, the said borate having a boiling point of at least 100° C. and being present in an amount from the small quantity necessary to stabilize said rubber up to a quantity sufficient to render the composition plastic, said amount being not less than about 1% by weight of said rubber; the composition, exclusive of said rubber, being substantially free from materials generating corrosive chlorine.

13. Method of making a composition of matter which comprises mixing halogenated rubber and a borate of an alcohol, said borate having a boiling point of at least 100° C. and the amount of said borate being from the small quantity necessary to stabilize said rubber up to a quantity sufficient to render the composition plastic, said amount being not less than about 1% by weight of said rubber; the said alcohol being composed of carbon, hydrogen and oxygen in which none of the oxygen atoms are attached to the same carbon atom by more than a single bond; the composition, exclusive of the said rubber, being substantially free from materials generating corrosive chlorine.

JOHN M. COE.